(12) United States Patent
Johnson et al.

(10) Patent No.: US 6,530,697 B1
(45) Date of Patent: Mar. 11, 2003

(54) MULTI-MODE FIBER COUPLER, SYSTEM AND ASSOCIATED METHODS

(75) Inventors: Eric G. Johnson; Michael R. Feldman, both of Charlotte, NC (US)

(73) Assignee: Digital Optics Corp., Charlotte, NC (US)

(*) Notice: Subject to any disclaimer, the term of this patent is extended or adjusted under 35 U.S.C. 154(b) by 0 days.

(21) Appl. No.: 09/329,996

(22) Filed: Jun. 11, 1999

Related U.S. Application Data

(60) Provisional application No. 60/101,367, filed on Sep. 22, 1998.

(51) Int. Cl.⁷ ................................................. G02B 6/36
(52) U.S. Cl. ............................. 385/88; 385/89; 385/92; 385/93; 385/33
(58) Field of Search ................................ 385/88–93, 33, 385/34, 35

(56) References Cited

U.S. PATENT DOCUMENTS

| | | | |
|---|---|---|---|
| 4,799,755 A | * | 1/1989 | Jones |
| 4,865,409 A | * | 9/1989 | Althaus et al. |
| 5,416,862 A | | 5/1995 | Haas et al. |
| 5,898,802 A | | 4/1999 | Chen et al. |
| 5,963,696 A | | 10/1999 | Yoshida et al. |
| 6,064,786 A | | 5/2000 | Cunningham et al. |

FOREIGN PATENT DOCUMENTS

| | | |
|---|---|---|
| EP | 0 595 449 A1 | 4/1993 |
| WO | WO 00/13051 | 3/2000 |

* cited by examiner

*Primary Examiner*—Hung N. Ngo
(74) *Attorney, Agent, or Firm*—Susan S. Morse

(57) ABSTRACT

An optical coupler reduces differential mode delay in a fiber by reducing an amount of light incident on the fiber in a region in which the refractive index is not well controlled. This region of the fiber is typically in the center of the fiber. The optical coupler directs light away from the this region and/or provides a high angle of incidence to any light on this region. A diffuser may be used to reduce sensitivity of the coupler to any fluctutations in the output of the light source. The optical coupler does not need to be offset from the center of the multi-mode coupler. A phase function of an azimuthal mode of the fiber may be imposed on the light beam so that a substantial null on axis is maintained even after propogation of the light beam beyond the depth of focus of the coupler. A diffractive element generating a beam which propogates in a spiral fashion along an axis allows the shape of the beam to be maintained for longer than a depth of focus of the diffractive element.

41 Claims, 7 Drawing Sheets

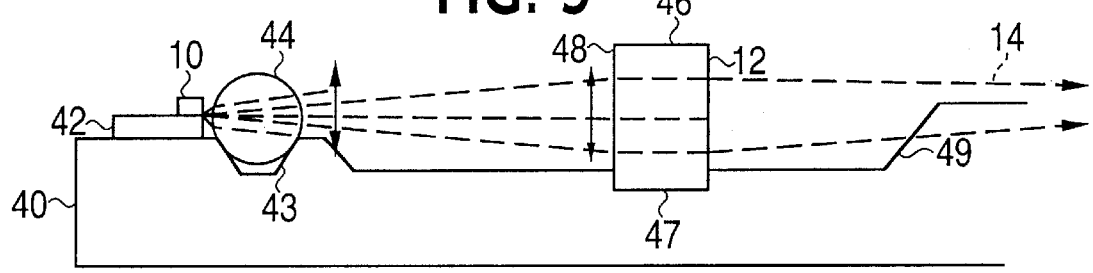
FIG. 9
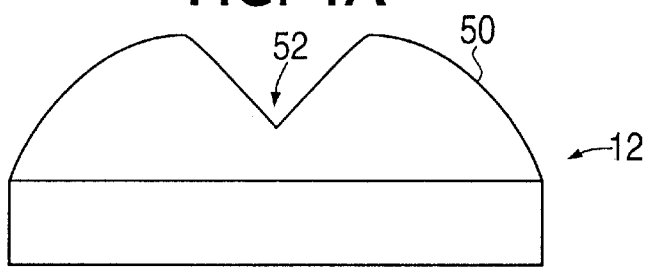
FIG. 4A
FIG. 5
FIG. 4B

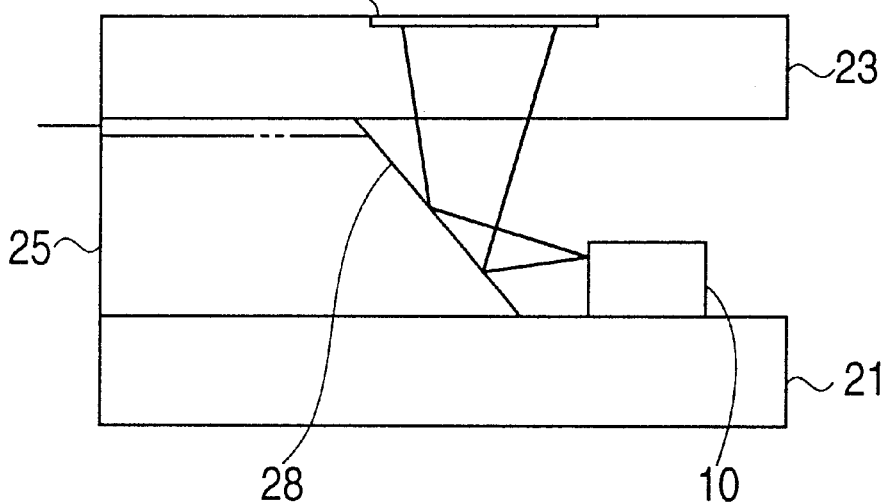
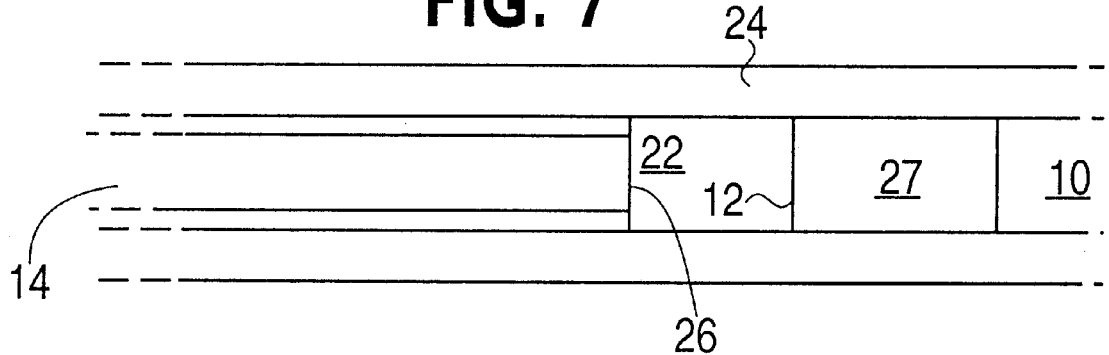
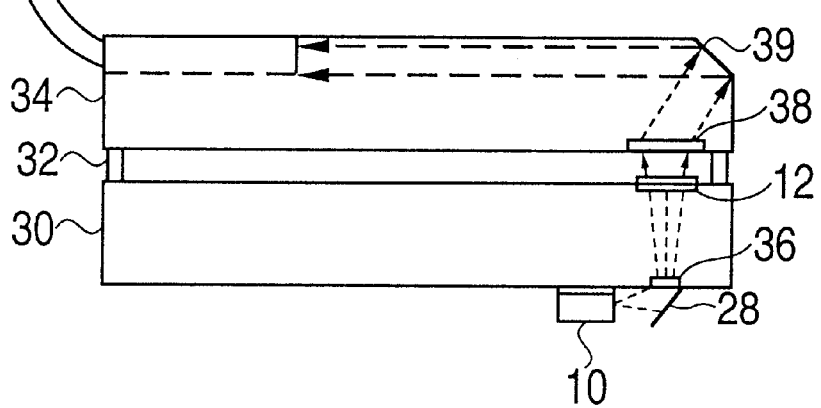

US 6,530,697 B1

MULTI-MODE FIBER COUPLER, SYSTEM AND ASSOCIATED METHODS

CROSS-REFERENCES TO RELATED APPLICATIONS

The present application claims priority under 35 U.S.C. §119 to Provisional Application No. 60/101,367 filed on Sep. 22, 1998, the entire contents of which are hereby incorporated by reference for all purposes.

BACKGROUND OF THE INVENTION

1. Field of the Invention

The present invention is directed to a coupler for coupling light to a multi-mode fiber.

2. Description of Related Art

It is very difficult to manufacture a multi-mode fiber with good control over the index of refraction in the center of the fiber. If the light coupled to the fiber excites some modes that propagate mostly in the center of the fiber and other modes which do not propagate mostly in the center of the fiber, very different propagation times for these modes may result. This is referred to as differential mode delay. Differential mode delay tends to spread out the pulse length of signals and reduce the effective bandwidth of the fiber.

Modes which propagate mostly in the center of the fiber are the lower order fiber modes, i.e., modes having small propagation angles that strike at or near the center of the fiber. These lower order modes spend most of the time in the center of the fiber, tend to travel straight down the fiber and the shape of these modes does not change much as they propagate. Therefore, in order to reduce differential mode delay, any light which enters near the center of the fiber needs to be incident at an angle which is large enough not to excite lower order modes, but not so large that the critical angle is exceeded and the light fails to be coupled or no light should be input to the center of the fiber.

One current solution involves coupling light into single mode fibers which are then positioned off-axis relative to the multi-mode fiber. Single mode fibers have a much smaller core than multi-mode fibers, so can be used to provide light at specific positions on the endface of the multi-mode fiber. However, single mode coupling is more expensive than multi-mode coupling and the additional coupling step leads to an increase loss in light. Further, while no light enters the fiber of the center for this configuration, the light will still cross the fiber axis as it propagates, thus increasing the differential mode delay. Additionally, ferrules or other structures housing the multi-mode fiber:to a single mode fiber junction are not readily available and must be developed specifically for that purpose.

Another solution is to use a vertical cavity surface emitting laser (VCSEL) excited to radiate in a ring mode. The operation of the VCSEL in radiation modes other than the lowest order have less predictable flux distributions than in the lowest order mode, in which the distribution more closely approximates a Gaussian profile. Further, there will still be some power in the lower order modes of the VCSEL. Additionally, such operation of the VCSEL often requires a higher current to drive the source into the higher radiation modes.

SUMMARY OF THE PRESENT INVENTION

The present invention is therefore directed to a multi-mode fiber coupler which substantially overcomes one or more of the problems due to the limitations and disadvantages of the related art.

More specifically, it is an object of the present invention to reduce differential mode delay while coupling light into a multi-mode fiber.

It is another object of the present invention to efficiently couple light into a multi-mode fiber without requiring an offset fiber or additional beam shapers for the light source.

It is another object of the present invention to use an optical element to direct light away from the center of the fiber.

It is a further object of the present invention to provide coupling to a multi-mode fiber which is relatively insensitive to variation in light output from a light source.

It is yet another object of the present invention to provide a diffractive element which generates a beam propagating in a spiral fashion.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

BRIEF DESCRIPTION OF THE DRAWINGS

The foregoing and other objects, aspects and advantages will be described with reference to drawings, in which:

FIGS. 4A, 4B and 5 show other embodiments of the optical element and/or beam shaper of the present invention;

FIG. 6 shows the integration of a light source and the coupler of the present invention;

FIG. 7 shows the integration of the multi-mode coupler of the present invention with the fiber;

FIG. 8 shows the integration of the multi-mode coupler of the present invention with the light source and the fiber;

FIG. 9 shows the integration of the multi-mode coupler of the present invention with the light source,and the fiber on a silicon bench;

DETAILED DESCRIPTION OF PREFERRED EMBODIMENTS

Figure 1A:
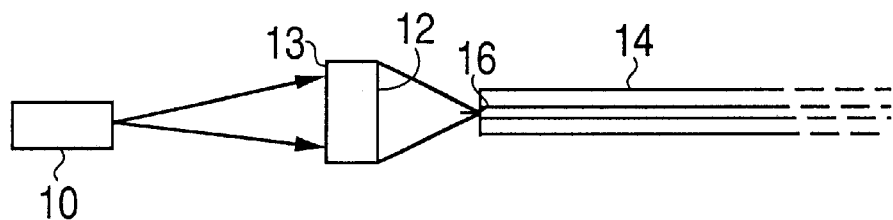
FIG. 1A is a schematic view of one embodiment of the present invention.
Figure 1B:
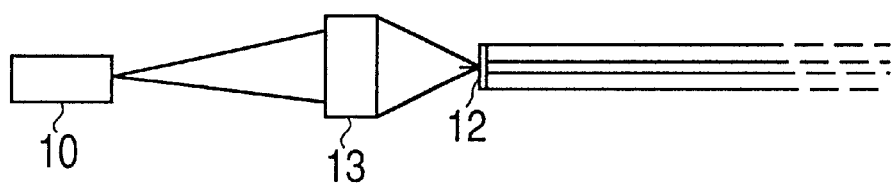
FIG. 1B is a schematic view of another embodiment of the present invention.

FIGS. 1A and 1B schematically illustrate different configurations of the multi-mode coupler of the present invention. A light source 10, such as a VCSEL, an edge emitting laser or a single mode fiber, outputs light which is incident on a beam shaper 13 which shapes the beam and an optical element 12 together forming the coupler. The light is then supplied to a core 16 of a multi-mode fiber 14.

The end face of the fiber is typically located near the image plane of the optical system as determined by the focal length of the beam shaper 13 and the object distance, i.e., the distance from the light source 10 to the beam shaper 13. If the fiber 14 is placed substantially further than a depth of focus away from the image plane, then the beam will be bigger than the core 16 of the fiber 14, resulting in less light being coupled to the fiber 14.

The optical element 12 may direct light away from a center of the core 16 of the fiber 14 by, e.g., increasing the angle of light in the center of the beam so that light in the center will be incident on the outer edges of the core 16 of the fiber 14 or by delivering no light to the center of the core. Thus, either no light is delivered to a center 16 of the fiber 14 or any light which is incident on the center 16 of the fiber 14 will be incident at a high enough angle to be coupled into the desired higher order modes.

In addition to the optical element 12, a beam shaper 13 may be provided in either embodiment. The beam shaper 13 may be integrated with the optical element 12 on a same surface or on an opposite surface of the same structure. The beam shaper 13 may also be closely spaced to the optical element 12. As shown in FIG. 1B, the beam shaper 13 may be placed at a specific distance from the light source 10, with the optical element 12 being very close to or even flush with the fiber 14. Each embodiment has attendant advantages and disadvantages as discussed below.

The beam shaper 13 performs a one-to-one mapping from the input plane to the output plane thereof. The performance of the beam shaper may be evaluated using ray tracing. Typically, the beam shaper 13 is used for focusing the beam output by the light source 10, which will usually be on the order of a several hundred microns in the plane of the beam shaper, to a diameter which is smaller than the diameter of the core, which is usually on the order of 50 microns. If the beam shaper is a lens, theoretically, light is focused to a point. But in reality, if the light incident on the lens has a Gaussian profile, the light output from the lens will still have a Gaussian profile. Another useful beam shaper for the coupling of the present invention is a super-Gaussian element. A super-Gaussian element converts an input beam of a particular intensity distribution into a beam with a super-Gaussian distribution, thereby providing a focused output beam having a flatter peak and a much faster fall off to zero than a normal Gaussian beam. Thus, such a beam has a fairly uniform power distribution across the peak, pushing more power to the edges and leaving less in the center as compared to a normal Gaussian. When the optical element serves as an optical profile altering element, the beam shaping and the optical element may be formed on a single surface.

While the ratio between the distance from the light source 10 to the beam shaper and the distance from the beam shaper to the fiber 14 shown in FIGS 1A and 1B, in which an edge emitting laser is used as the light source, is typically 2:1, when using a VCSEL as the light source 10, this ratio is typically closer to 1:1. The actual ratio will depend on the numerical aperture of the source and the numerical aperture of the fiber. Further, depending upon the desired coupling, the beam incident on the fiber may be smaller than the core or larger than the core. For most applications, source and fibers, the ratio will be between 1:4 and 4:1.

Figure 2:
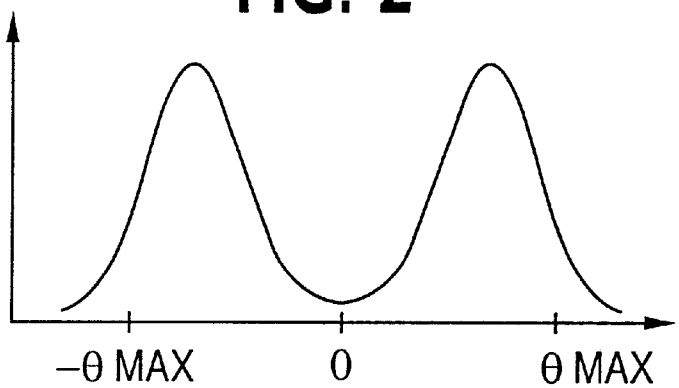
FIG. 2 is a radiation profile of light traversing an embodiment of the optical element 12 of FIG. 1A or 1B.

There are three primary design approaches for achieving the desired shaping by the optical element 12. The radiation profile of light having traversed a first embodiment of the optical element 12 is shown in FIG. 2. As can be seen in FIG. 2, the radiation profile has been altered by the optical element 12 to be bimodal. This bimodal distribution is Gaussian shaped for each peak, each peak being centered on an absolute angular value between zero and $\theta max$, where $\theta max$ is the critical angle for the multi-mode fiber 14.

In the first design, the optical element 12 is a diffractive diffuser which diffuses, i.e., substantially each point of light incident on the diffuser substantially contributes to substantially every point of light in the output plane, the light into the desired angular distribution. The angles will all be less than the critical angle for the fiber 14. Thus, if there is change in the output profile of the light from the light source, which is of particular concern when using a VCSEL as the light source 10, the coupling to the multi-mode fiber will not be affected. Additionally, if the diffractive diffuser does not also provide collimation or focusing to the light, precise alignment of the diffractive diffuser is not needed.

A diffractive diffuser may be formed by setting the fast Fourier transform (FFT) to be a ring, i.e., set the fringe period of the diffractive between the two values bounding the ring. In order for the diffractive diffuser serving as the optical element 12 to function properly, it must be positioned at least more than a width of the core, preferably at least three to five times the width of the core, away from the fiber. This placement ensures that substantially every point of light incident on the diffuser substantially contributes to substantially all of the pattern incident on the fiber. Such a Fourier transform diffractive diffuser may be realized in accordance with U.S. Pat. No. 5,850,300, which is hereby incorporate by reference in its entirety.

The diffractive diffuser preferably alters the angular distribution of the light into any desired angular distribution which will efficiently coupler the light into the higher order modes of the multi-mode fiber. This desired angular distribution will typically be a ring, an annulus or a grid of N spots, but may be any other desired angular distribution for a particular multi-mode fiber. For example, a radial grating may be provided which sends a significant portion of the light, e.g., 80%, into the ±1 order and randomly varies the period to provide the range of desired angles radially away from the center. Further, a ring or a multipole of N spots, e.g. a quadropole of 4 spots, where N is an integer greater than or equal to one, may be realized by providing a grating to create spots located at $r_N$, where $r_N$ is a distance from the center to the spot. Additionally, the diffractive diffuser may be a binary element which splits the light into two beams directed to the periphery of the fiber core.

While a Fourier transform diffractive diffuser as described above is useful when employing a light source having an unstable output beam profile, this diffractive diffuser is difficult to use in the configuration of FIG. 1B, since the optical element 12 is too close to the fiber 14 for a Fourier transform diffractive diffuser to create, for example, a ring on the end face of the fiber. If the optical element 12 is more than a few wavelengths away from the end of the fiber, a diffuser serving as the optical element 12 will function properly. Additionally, diffusers often have lower efficiencies than other optical elements. The following two designs may be used with either configuration of FIGS. 1A and 1B.

Figure 3:
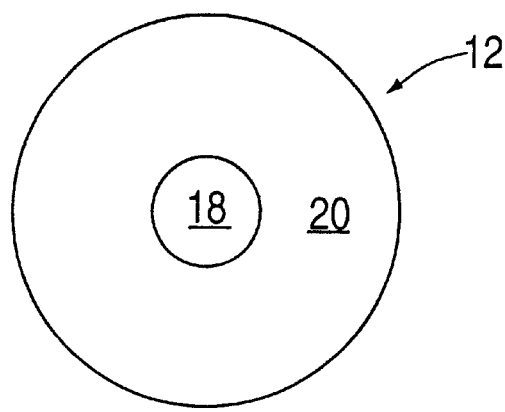
FIG. 3 shows another embodiment of the optical element of the present invention.

A generic embodiment of the second design is illustrated in FIG. 3. As can be seen therein, the optical element 12 is composed of a central region 18 and a peripheral region 20. The central region 18 and the peripheral region affect the beam incident thereon differently. These different regions may be discretely different, include subregions of different functioning, and/or may continuously vary the treatment of the light from the center to the periphery. For example, the central region 18 deflects the light incident thereon away from the center. The peripheral region 20 may not affect the light incident thereon at all, or it may be designed to, for example, collimate the light incident thereon. Using such an element allows the light in the center of the beam which would have been incident on the center of the fiber to be deflected away to edges of the fiber, while not imposing an increase in the angle on the light near the edge of the beam which would already be incident upon the desired portion of the fiber. Alternatively, although not as efficiently, the central region may simply block the light incident thereon to form the desired ring shape.

A specific embodiment of the second design is illustrated in FIG. 4A. The optical element 12 provides a one to one mapping of each point to the fiber, while continuously varying the element encountered by the light from the center to the periphery. A converging portion 50 of the coupler 12 converges, i.e., reduces the incident angle, of light at the outer edge of the beam. A diverging prism 52 of the optical element 12 diverges, i.e., increases the angle of the light, of light in the center of the beam to prevent light from hitting the center of the fiber. Another specific embodiment of one to one mapping is shown in FIG. 4B in which a diverging portion 54 is located in the center of the optical element again to diverge light in the center of the beam. FIGS. 4A and 4B are radially symmetric.

Another specific embodiment of the second design is shown in FIG. 5. FIG. 5 is a cross-section of a prism. If this cross-section is used to form a linear prism, such that there is a variation in thickness along the axis coming out of the plane of the page, two spots will be generated in the image plane of the system. When a linear prism is combined with a lens function, the cross-section will look like FIG. 4B, but will not be radially symmetric, since the linear prism is not radially symmetric. If the cross-section in FIG. 5 is rotated radially to form a radial prism, a ring will be generated in the image plane of the system. If the radial prism is combined with a lens function, the cross-section will look like FIG. 4B and will be radially symmetric.

In the embodiments of the second design, light near the edge of the beam can be mapped to the edge of the fiber with little or no increase in the angle. Light from the center of the beam can be mapped to the edges of the fiber. Where the optical element 12 is illustrated as a refractive element in the embodiments of the second design, the optical element 12 may be designed as a diffractive element using the known diffractive approximation of the refractive element, either as a continuous diffractive or as a discrete diffractive. Preferably, the diffractive elements are computer generated holograms.

The same effect as provided by configurations of the second design may be realized by providing an optical element having diffuser patches having finer features and/or smaller periods closer to the center and larger features and/or larger periods towards the periphery or nothing at the periphery. At the edge of the element the light is not effected, or has a small increase in angle, and the light at the center is diffused to increase the angle of light towards the center. As long as the diffuser patches are distributed on the optical element so that it does not treat the center and the periphery in the same manner, e.g., a diffuser only at the center or a gradient diffuser, the diffuser patches may be used next to the end face of the fiber, such as shown in FIG. 1B. Such diffusing patches may also be multiplexed with any desired lens function.

Further, while the embodiments of the second design have been discussed with reference to the optical element 12, the second design may also be used as the beam shaper with the optical element of the first design or the optical element of the third design, discussed below. Further, when using a diffractive diffuser which splits the light into two beams directed to the periphery of the fiber core, this element does not have to be unitary, but may be split into half. In such a configuration, the two elements serve as a beam shaper, with one half mapping the light incident thereon to one point and the other half mapping the light incident thereon to another point.

The above discussion has assumed that the ideal radiation pattern for coupling light into the fiber is a ring. Generally, the ideal radiation pattern, and hence the desired angular distribution, will be a function of the properties of the fiber, i.e., where propagation is most efficient. The design of the coupler for achieving the desired angular distribution will also depend on the radiation profile output by the light source used to illuminate the fiber.

Any of the above designs may be integrated with other optical functions, such as collimation, in a single element, as shown in FIGS. 4A, 4B and 5. For the integration of the coupler with additional optical functioning, the additional functioning may be multiplexed with the shaping function, as disclosed in commonly assigned, co-pending application U.S. patent application Ser. No. 09/296,397 filed Apr. 23, 1999, entitled "Diffusing Imager and Associated Methods" which is hereby incorporated by reference in its entirety. Further, any of the above designs may be integrated with the other elements of the light source/fiber system, including further optical elements as discussed below.

FIG. 6 illustrates the integration of the light source 10 with the coupler 12. In the specific example shown in FIG. 6, the light source 10 is an edge emitting laser mounted on a substrate 21. The light from the laser is directed onto the coupler 12 mounted on a substrate 23 by a reflective surface 28 formed on a block 25, which also separates the wafers 21, 23. The block 23 may be formed from the substrate 21. If a vertical cavity surface emitting laser is employed, the reflective surface is not needed. Also, while a diffractive embodiment of the coupler 12 is shown, a refractive embodiment could similarly be integrated. The coupler 12 is preferably created lithographically and is integrated with the laser on a wafer level.

FIG. 7 illustrates the integration of the optical fiber 14 with a rod 22 containing the coupler 12. Both the fiber 14 and the rod 22 are housed within a ferrule 24 or other housing containing the fiber. The fiber and the rod are bonded together with an adhesive 26. Alternatively, the integrated light source-coupler shown in FIG. 6 can be provided in the housing with the fiber 14. Additionally, if the beam from the light source 10 needs to be expanded, an expanding element 27 may be provided between the light source and the diffractive element 12. For compactness, the expanding element 27 advantageously will be a GRIN lens or a rod lens. Depending on the size of the beam output by the light source 10, the expanding element 27 could just provide distance for the beam to expand.

FIG. 8 illustrates the integration of the light source 10 with the coupler 12 and the fiber 14 on a wafer level. Wafers 30 and 34 are bonded together via posts 32, which provide a predetermined separation between the wafers. The light source 10 may be bonded directly to the wafer 30 or may be mounted on an additional wafer which is then in turn bonded to the wafer 30. If the light source is an edge emitting light source, a mirror 28 for directing the light is provided. An optical element 36 collimates the light. The coupler 12 then shapes the light into the desired profile. A further optical element 38 directs the shaped light onto a reflector 39, which in turn directs the shaped light onto the optical fiber 14. Preferably, all of the optical elements are formed lithographically and all the elements are integrated on a wafer level.

FIG. 9 illustrates the light source 10, the coupler 12 and the fiber 14 mounted on an optical bench 40, preferably a silicon bench. The light source is preferably mounted on an electronics bench 42. The light source typically outputs a beam having a rapidly diverging fast axis and a more slowly diverging slow axis. A refractive element 44 having a high numerical aperture, e.g., a gradient index lens, alters the divergence angle along the fast axis such that, at the output of the high numerical aperture element, the fast axis has a divergence that is less than the divergence angle of the slow axis. The refractive element is mounted in a v-groove 43.

A die 46 containing the coupler 12 is positioned a distance from the refractive element 44 such that a diameter of the beam incident thereon is substantially the same along both axes, i.e., the beam is substantially circular. In a particular example, a collimating element 48 is provided on the front surface of the die 46, with the coupler 12 being on the back surface of the die 46. A lower plane is provided to accommodate the diverging beam and the die 46 is mounted in a notch 47 in the lower plane. The shaped beam output from the diffractive element 12 is then delivered to the fiber 14 which is mounted in a v-groove 49 in the bench 40, which may be a silicon wafer. Again, preferably all the optical elements are formed lithographically and all the elements are integrated on a wafer level.

Figure 10:
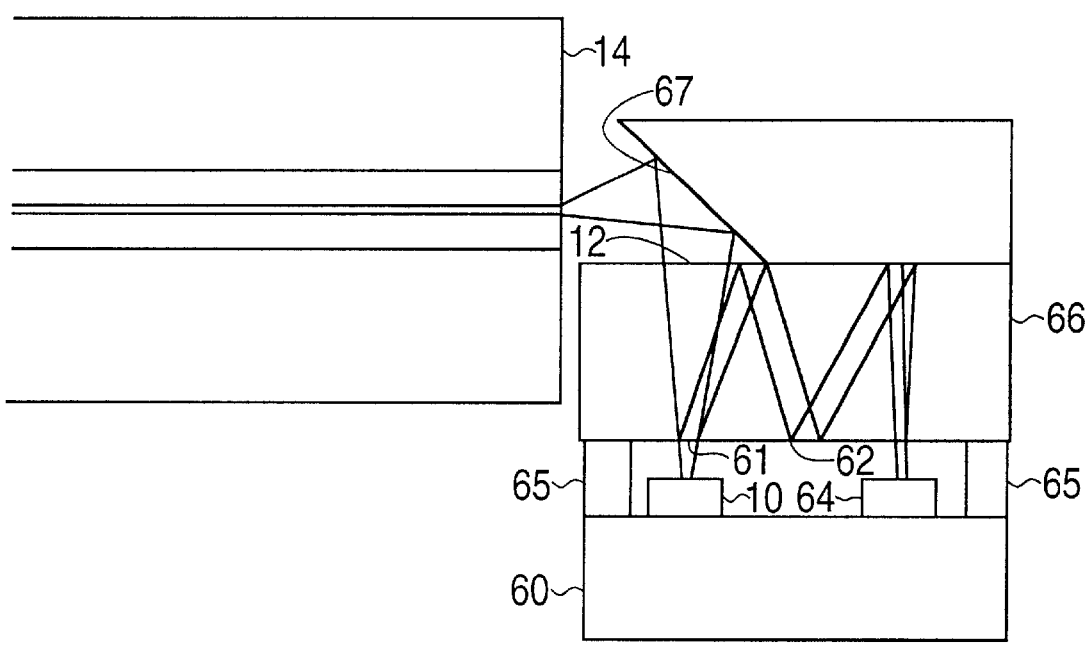
FIG. 10 shows the integration of the multi-mode coupler of the present invention with a light source, a fiber and a light source power monitor.

FIG. 10 illustrates the light source 10, here a VCSEL, the coupler 12 and the multi-mode fiber 14 integrated with a power monitor 64 and a reflective surface 67 for directing the light into the fiber 14. In particular, the light source 10 and the power monitor 64 are provided on a substrate 60. Another substrate 66 has the coupler 12 thereon, preferably on the face furthest from the light source to allow the beam to expand, and a splitting diffractive element 61 which splits off a portion of the light from the light source 10 to be monitored. The substrates 60, 66 are preferably mounted with spacer blocks 65, which provide the desired separation between the substrates 60, 66.

The light split off by the diffractive element 61 is directed to the power monitor 64 to monitor the operation of the light source 10. The directed of the light to the power monitor 64 may be achieved by providing appropriately positioned reflective portions. The number of times the light to be monitored traverses the substrate 66 is a design choice, depending on the initial angle of diffraction and the desired positioning of the power monitor 64.

The light which is not split off by the diffractive element 61 proceeds to the coupler 12. A reflective surface 67, such as a polished angular face of another substrate, is provided to direct the light from the coupler 12 into the multi-mode fiber. Again, preferably all the optical elements are formed lithographically and all the elements are integrated on a wafer level.

While the above multi-mode coupler improves on previous couplers, additional performance may be realized by a third design, which uses a diffractive element to match the phase as well as the intensity distribution of the beam. The matching of the phases generates spiral propagation of the beam through the fiber. This spiral propagation maintains the intensity profile input to the fiber along the fiber. Since the beam travels in a corkscrew, the amount of light crossing the center of the fiber is significantly reduced. For the purposes of the present invention, the center of the multi-mode fiber is considered to be the region in which the refractive index is not sufficiently controlled such that differential mode delay arises.

Ideally, the intensity of light in the center will be zero, but in practice, the intensity of light on axis is on the order of 10% of the peak intensity. This reduced intensity is a substantial null. In contrast, when only the intensity distribution is controlled, as in the other two designs, the input intensity profile may be the desired profile, but it well quickly degrade as the light traverses the fiber. In other words, while the other designs may provide an input profile which has a substantial null on axis, this profile is only maintained for the depth of focus of the coupler. When also matching the phase, this profile is maintained substantially beyond the depth of focus of a lens having the same numerical aperture as the beam to be input to the fiber, e.g., at least an order of magnitude longer. Absent the fiber, the substantial null on axis of the beam is maintained through free space, which significantly reduces the alignment requirement. Further, by matching the phase and amplitude of the beam to a certain mode of the fiber, theoretically the beam profile could be maintained over an infinite length of fiber. However, imperfections in the real world, e.g., in the fiber, in the beam, in the matching, degrade from this theoretical scenario. Nevertheless, with a matched phase and amplitude mode, the beam profile is maintained over a long distance in the fiber.

Thus, in order to avoid low order modes in a GRIN fiber launch, the amplitude and phase of the higher order modes need to be matched. The following equations are set forth in *Fields and Waves in Communication Electronics*, Simon Ramo et al. 1984, particularly pp. 765–768, which is hereby incorporated by reference in its entirety. For a GRIN fiber, these eigenmodes all have the form set forth in Equation (1):

$$E(r,\phi,z) f_{mp}(r) e^{\pm jm\phi} e^{\pm j\beta_{mp}z} \tag{1}$$

where $f(r)$ is a function that depends only on r for given modes within a specific fiber, r is the radius from the axis, $\phi$ is the angle from the axis, z is the distance along the axis, m is the azimuthal mode number, $\beta$ is a propagation constant, p is the radial mode number. When m, p=0, the beam has a Gaussian profile.

While Equation (1) could be used to match a particular mode of the fiber by creating an input light beam having an amplitude and phase function which exactly corresond to the particualr mode, such matching is not required. The azimuthal phase portion of Equation (1) is given by Equation (2). In order to supress the lowest order mode, i.e., m=0, a phase term needs to be added to the wave front. This is accomplished through the use of the following diffractive phase function encoded onto the wavefront set forth in Equation (2):

$$\phi(x, y) = m \arctan\left(\frac{y}{x}\right) \tag{2}$$

where $\phi$ is the phase function, x and y are the coordinates in the plane. Any amplitude function may be used. As long as m>0 and the phase function is given by Equation (2), the phase function will provide spiral propagation. Additionally, a substantial null at the center of the beam is created after having been phase matched after propagating over a short distance, i.e., a few wavelengths. Unlike other types of coupling, this substantial null is maintained in the center in both free space and the fiber, so such an optical element providing such a phase function does not have to be immediatley adjacent to the fiber.

In general, once the beam is in the fiber, there will be several modes excited in the fiber. This multiple excitation will arise even if both the phase and amplitude are matched, but will even more readily arise when only the phase function is provided by the optical element. Each mode has a different intensity distribution, i.e., a differnt size of the substantial null on axis and a different width of the annulus. The spiral mode may be realized, for example, by setting m=3 and providing the phase function according to Equation (2).

This phase function can be added to a lens function and encoded as a mod(2π) diffractive element as set forth in Equation (3):

$$\phi(x, y) = \frac{\pi(x^2 + y^2)}{\lambda f} + m \arctan\left(\frac{y}{x}\right) \quad (3)$$

Figure 11A:
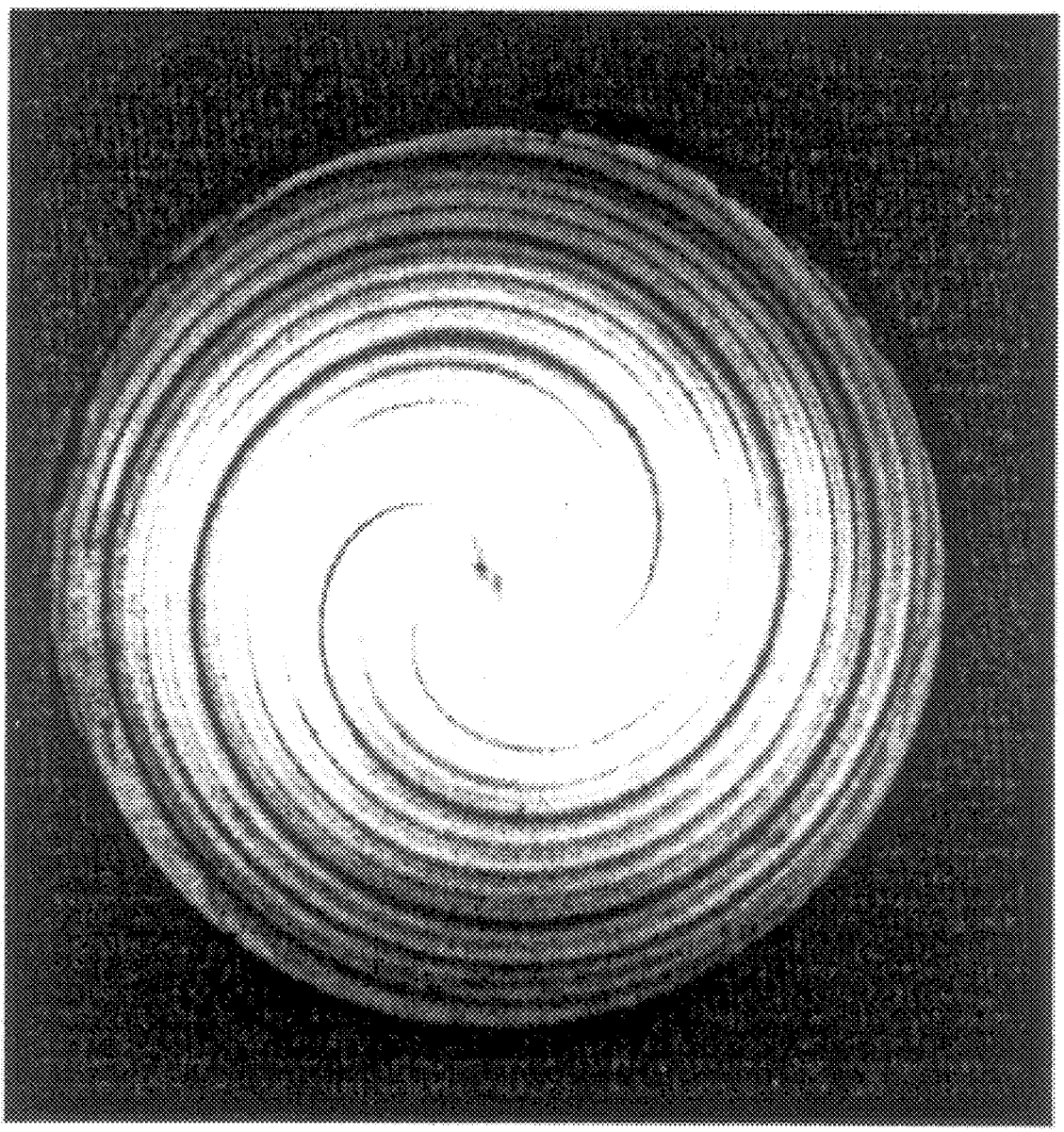
FIGS. 11A–11C illustrate a diffractive element and associated. characteristics of a spiral generator of the present invention.
Figure 11B:
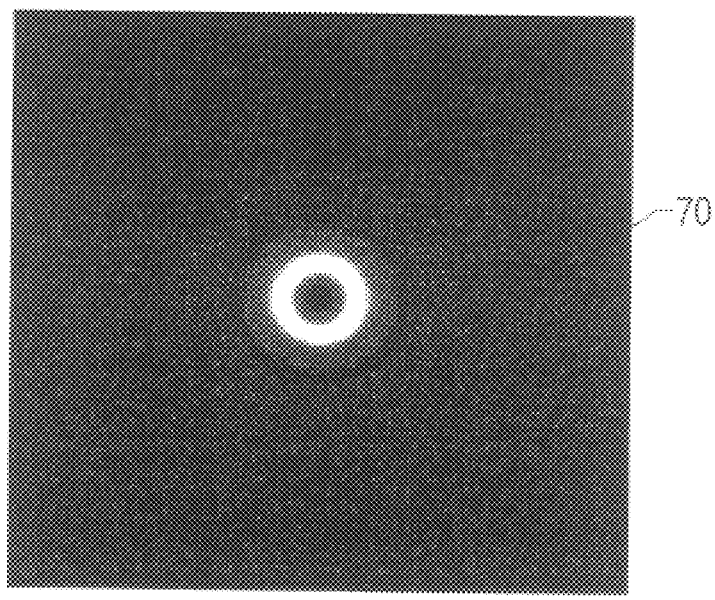
Figure 11C:
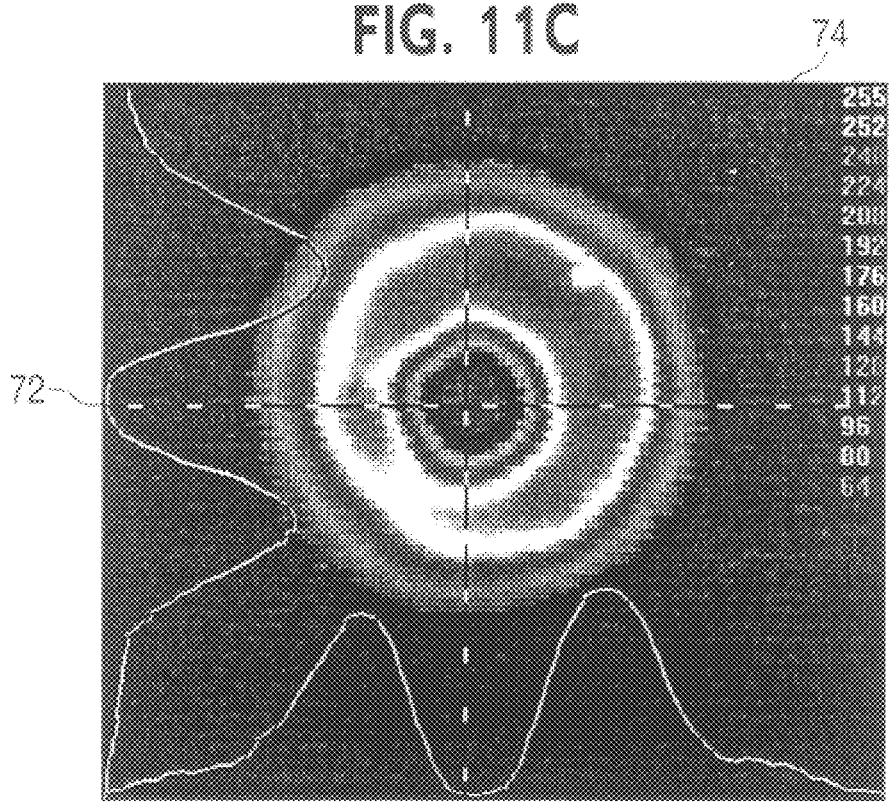

FIG. 11A illustrates the mod(2π) diffractive element and the corresponding intensity in the focal plane of the lens function. FIG. 11B illustrates an actual example of a spiral diffractive element or vortex lens 70 created in accordance with Equation (3). FIG. 11C illustrates the simulated ring intensity 72 and the measured intensity pattern 74 of the vortex lens 70 in FIG. 11B. This vortex lens 70 may be used in place of the diffractive element 12 in any of the above configurations. A refractive equivalent in accordance with Equation (3) of the vortex lens 70 may be alternately employed.

This vortex lens 70 may be used in place of the optical element 12 in any of the previously discussed embodiments. This vortex lens 70 may be considered a beam shaper which directs light at a tangent azimuthally. The closer to the center of the vortex lens, the more light is directed away from the center.

The vortex lens 70 allows the desired angular distribution to be susbtantially maintained along a portion of the fiber. This may be quantified by measuring the amount of power within a certain radius of the fiber at a certain distance along the fiber. The spiral phase function of the present invention allows more power to be contained within the desired radii for a longer distance than methods not employing spiral propagation.

Figure 12:
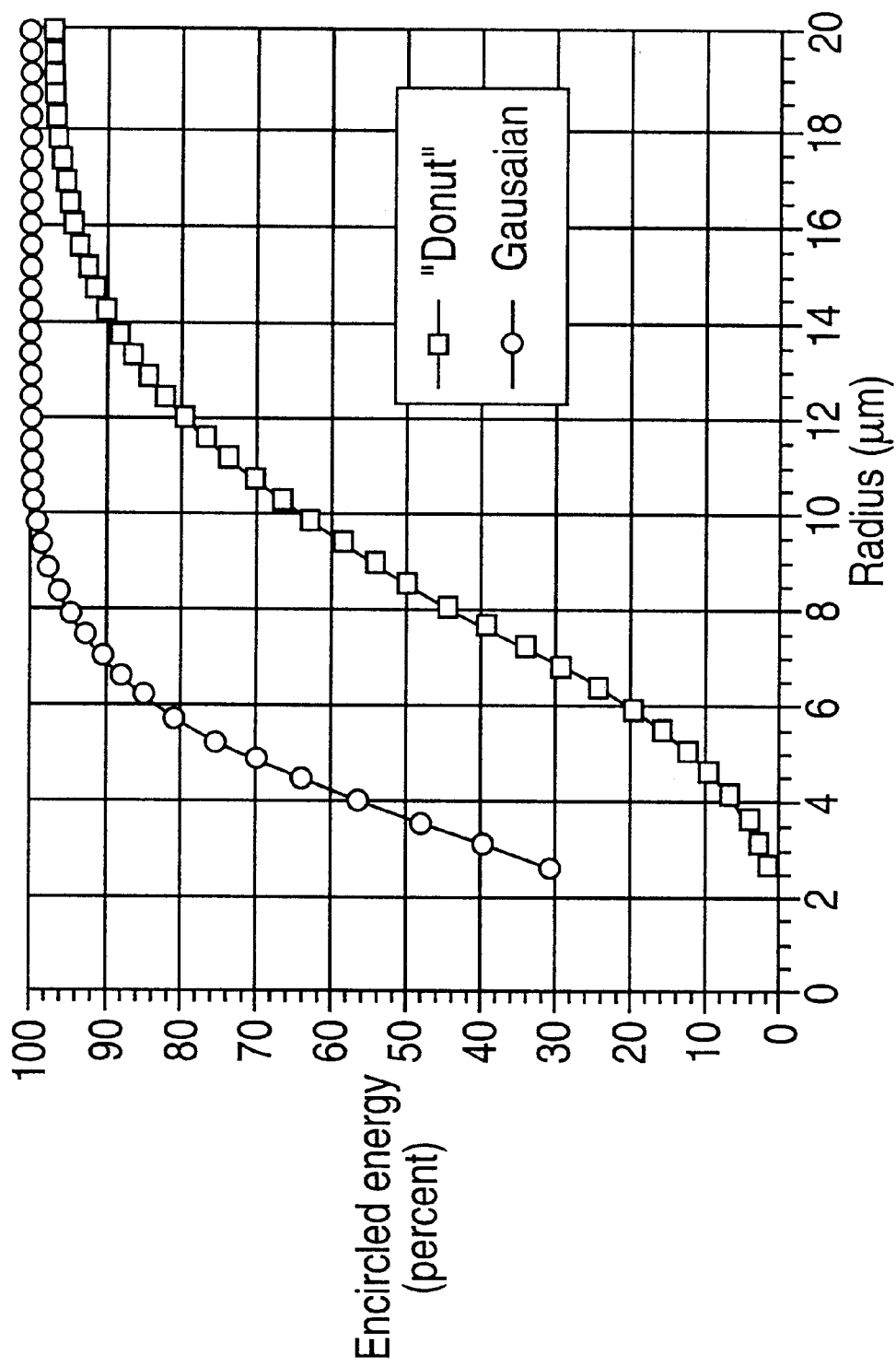
FIG. 12 are comparative plots of encircled incident energy for a Gaussian beam and a donut shaped spiral beam.

FIG. 12 is a plot of the the radius of the fiber and the encircled energy encompassed thereby for a beam having a Gaussian profile and a beam having a spiral ring profile after propagating along a fiber for 6 m. As can be seen therein, noting that the plot is cumulative, not incremental, more than half of the power of the light is within a 4 micron radius and all of the power of the light is within 10 microns for the Gaussian beam profile. Thus, for a Gaussian beam, no light is incident in a radius greater than 10 microns. In contrast, for the spiral ring profile, only a little over 60% of the light power is encircled in a 10 micron radius. Further, less than 10% of the light power is encircled by a radius of 4.5 microns. This compares favorably with current requirements of 12.5% encircled power with a radius of 4.5 microns, presently achieved using a VCSEL driven into a ring mode.

The ability of the beam having a spiral phase function imposed thereon to maintain a desired power distribution over a propogation distance renders the vortex lens useful for other purposes as well as for coupling to a mult-mode fiber. For example, any application which would benefit from keeping power away from a center region of an object could use the vortex lens to achieve this goal over an extended propagation distance.

The above different designs are useful in varying situations and the different configurations shown in FIGS. 1A and 1B. For example, the use of a Fourier transform diffractive diffuser as the optical element 12 in FIG. 1B is not very practical, since there will not be enough room for a clean output shape, e.g., a ring to be formed from such a diffuser. However, the vortex lens 70 and the embodiments shown, for example, in FIGS. 4A, 4B and 5, including their diffractive diffusing patch equivalents, may be successfully employed with the configuration of FIG. 1B as well as FIG. 1A. The configuration of FIG. 1B is advantageous, since it allows a conventional subassembly including a light source 10 and a lens to be used with the optical element 12 placed close to the fiber 14.

Thus, it is evident that the coupler of the present invention is readily incorporated into the light source/multi-mode fiber junction. The coupler of the present invention effectively and efficiently couples the light from the light source to the fiber, allowing more light to be coupled to the fiber than would be absent the coupler.

By matching the phases, the light from the coupler is input to the fiber traveling in a spiral fashion, i.e., the path of the light down the fiber forms a corkscrew. Such traversal is opposed to the linear travel normally occuring down the fiber. By traveling in a corkscrew or spiral mode, the input distribution, typically annular, of the input light is maintained along the fiber. Without the spiral phase function, while the initial input light has the desired shape, this shape is not retained throughout the traversal of the fiber. Therefore, more differntial mode delay will be present, with more light in the center of the fiber, if spiral generation is not used.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

What is claimed is:

1. An apparatus for coupling light from a light source into a optical fiber comprising an optical element for directing light from the light source away from an undesired portion of the optical fiber, wherein the optical element is an angular distribution altering element and light output from the angular distribution altering element is distributed in a desired angular distribution.

2. The apparatus of claim 1, wherein the desired angular distribution is a ring pattern.

3. The apparatus of claim 1, wherein the angular distribution altering element Is different for a central portion of the light beam than for a peripheral portion of the light beam.

4. The apparatus of claim 1, wherein the angular distribution altering element is a diffractive element and the desired angular distribution is a multi-pole pattern of series of N spots, where N is an integer and N≧1, distributed at locations $r_N$ where spots in the output plane are located at $r_N$ away from a center.

5. The apparatus of claim 1, wherein the optical element is designed in accordance with a profile of a beam output by the light source and desired modes of propagation for the optical fiber.

6. The apparatus of claim 1, wherein the optical element provides a first angle of divergence for light in a central portion of a light beam from the light source and a second angle of divergence for light in a peripheral portion of the light beam, the first angle being greater than the second angle.

7. The apparatus of claim 1, wherein the optical element is provided in a housing which receives the optical fiber.

8. The apparatus of claim 1, wherein the optical element is lithographically created on a wafer level.

9. The apparatus of claim 1, further comprising an optical bench including mounts for the light source, the fiber and the optical element.

10. The apparatus of claim 1, wherein the optical element incorporates further optical functioning therein.

11. The apparatus of claim 1, wherein the optical element is a diffractive diffusing element.

12. The apparatus of claim 11, wherein light output from the diffractive diffusing element is distributed in a ring pattern.

13. The apparatus of claim 1, wherein the optical fiber is a multi-mode GRIN fiber and the optical element couples light into higher order modes of the multi-mode GRIN fiber to reduce differential mode delay.

14. The apparatus of claim 1, further comprising a beam shaping element in front of the optical element.

15. The apparatus of claim 14, wherein the beam shaping element outputs a beam having a substantially uniform peak.

16. The apparatus of claim 14, wherein the beam shaping element outputs a beam having a substantially uniform peak.

17. An apparatus for coupling light from a light source into a optical fiber comprising an optical element for directing light from the light source away from an undesired portion of the optical fiber, wherein light output from the optical element is distributed in a desired angular distribution which is substantially maintained along an axis of propogation for more than a depth of focus of the optical element.

18. The apparatus of claim 17, wherein light the desired angular distribution includes a null on the axis of propagation.

19. The apparatus of claim 17, wherein the optical element is a diffractive vortex lens.

20. The apparatus of claim 17, wherein the optical element is a refractive vortex lens.

21. The apparatus of claim 17, wherein the optical element is created in accordance with the following equation:

$$\phi(x, y) = m \arctan\left(\frac{y}{x}\right)$$

where $\phi$ is a phase function, x,y are positions in the plane, and m is an azimuthal mode number.

22. The apparatus of claim 17, wherein the optical element includes a lens function and is created in accordance with the following equation:

$$\phi(x, y) = \frac{\pi(x^2 + y^2)}{\lambda f} + m \arctan\left(\frac{y}{x}\right)$$

where $\phi$ is a phase function, x,y are positions in the plane, m is an azimuthal mode number and $\lambda$ is a wavelength of the light source.

23. A system for coupling light to an optical fiber comprising:
   a light source; and
   an optical element for directing light from the light source away from a center of the optical fiber, wherein the optical element is an angular distribution altering element.

24. The apparatus of claim 23, wherein the system is provided in a housing with the optical fiber.

25. The system of claim 23, wherein the system is integrated on a wafer level.

26. The system of claim 23, wherein the light output from the angular distribution altering element is distributed in a ring pattern.

27. The system of claim 23, wherein the angular distribution altering element is provided only for a central portion of the light beam.

28. The system of claim 23, wherein the angular distribution altering element is a diffractive diffusing element.

29. The system of claim 23, wherein the optical element is designed in accordance with a profile of a beam output by the light source and desired modes of propagation for the optical fiber.

30. The system of claim 23, wherein the optical element provides a first angle of divergence for light in a central portion of a light beam from the light source and a second angle of divergence for light in a peripheral portion of the light beam, the first angle being greater than the second angle.

31. The system of claim 23, wherein the optical element is a vortex lens, wherein light output from the optical element is distributed in a desired angular distribution which is substantially maintained along the fiber for more than a depth of focus of the optical element.

32. A method for coupling light into an optical fiber comprising:
   generating a light beam; and
   using an optical element for directing light from the light source away from a center of the optical fiber, wherein said directing further comprises adding a phase term to a wavefront of the light beam to match higher order modes of the fiber.

33. The method of claim 32, wherein said directing comprises altering an angular distribution of the beam to be distributed in a ring pattern.

34. A method for coupling light into an optical fiber comprising:
   generating a light beam; and
   using an optical element for directing light from the light source away from a center of the optical fiber, wherein said directing comprises shaping the beam and matching modes to provide light in a desired pattern and substantially maintain the desired pattern along an axis of propagation for more than a depth of focus of the optical element.

35. An apparatus for coupling light from a light source into a optical fiber comprising an optical element for directing light from the light source away from an undesired portion of the optical fiber, wherein the optical element is designed in accordance with a profile of a beam output by the light source and desired modes of propagation for the optical fiber.

36. An apparatus for coupling light from a light source into a optical fiber comprising an optical element for directing light from the light source away from an undesired portion of the optical fiber, wherein the optical element is provided in a housing which receives the optical fiber.

37. An apparatus for coupling light from a light source into a optical fiber comprising an optical element for directing light from the light source away from an undesired portion of the optical fiber, wherein the optical element is lithographically created on a wafer level.

38. An apparatus for coupling light from a light source into a optical fiber comprising an optical element for directing light from the light source away from an undesired portion of the optical fiber, further comprising an optical bench including mounts for the light source, the fiber and the optical element.

39. An apparatus for coupling light from a light source into a optical fiber comprising an optical element for directing light from the light source away from an undesired portion of the optical fiber, wherein the optical element incorporates further optical functioning therein.

40. An apparatus for coupling light from a light source into a optical fiber comprising an optical element for directing light from the light source away from an undesired portion of the optical fiber, wherein the optical fiber is a multi-mode GRIN fiber and the optical element couples light into higher order modes of the multi-mode GRIN fiber to reduce differential mode delay.

41. An apparatus for coupling light from a light source into a optical fiber comprising:

an optical element for directing light from the light source away from an undesired portion of the optical fiber; and a beam shaping element in front of the optical element.

* * * * *

UNITED STATES PATENT AND TRADEMARK OFFICE
CERTIFICATE OF CORRECTION

| | | |
|---|---|---|
| PATENT NO. | : 6,530,697 B1 | |
| APPLICATION NO. | : 09/329996 | |
| DATED | : March 11, 2003 | |
| INVENTOR(S) | : Eric G. Johnson, Michael R. Feldman and Thomas J. Suleski | |

It is certified that error appears in the above-identified patent and that said Letters Patent is hereby corrected as shown below:

Title Page, Item (75) should read:

-- (75) Inventors: Eric G. JOHNSON, Michael R. FELDMAN, Thomas J. SULESKI, all of Charlotte, NC (US) --

In the Claims:

Column 11, lines 28-31:

"15. The apparatus of claim 14, wherein the beam shaping element outputs a beam having a substantially uniform peak.
16. The apparatus of claim 14, wherein the beam shaping element outputs a beam having a substantially uniform peak."

should read:

-- 15. The apparatus of claim 14, wherein the beam shaping element outputs a beam having a substantially uniform peak.
16. (cancelled) --

Column 11, lines 41-43:

"18. The apparatus of claim 17, wherein light the desired angular distribution includes a null on the axis of propagation."

should read:

-- 18. The apparatus of claim 17, wherein the desired angular distribution includes a null on the axis of propagation. --

Signed and Sealed this
Twenty-fourth Day of September, 2013

Teresa Stanek Rea
*Deputy Director of the United States Patent and Trademark Office*